(12) United States Patent
Takahashi et al.

(10) Patent No.: US 11,697,856 B2
(45) Date of Patent: Jul. 11, 2023

(54) GRAIN-ORIENTED ELECTRICAL STEEL SHEET AND MANUFACTURING METHOD THEREOF

(71) Applicant: NIPPON STEEL CORPORATION, Tokyo (JP)

(72) Inventors: Fumiaki Takahashi, Tokyo (JP); Hideyuki Hamamura, Tokyo (JP); Satoshi Arai, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 366 days.

(21) Appl. No.: 16/967,368

(22) PCT Filed: Feb. 6, 2019

(86) PCT No.: PCT/JP2019/004282
§ 371 (c)(1),
(2) Date: Aug. 4, 2020

(87) PCT Pub. No.: WO2019/156127
PCT Pub. Date: Aug. 15, 2019

(65) Prior Publication Data
US 2020/0362431 A1 Nov. 19, 2020

(30) Foreign Application Priority Data
Feb. 9, 2018 (JP) ................. 2018-022233

(51) Int. Cl.
*C21D 9/46* (2006.01)
*C21D 8/12* (2006.01)
(Continued)

(52) U.S. Cl.
CPC ............ *C21D 8/1233* (2013.01); *C22C 38/00* (2013.01); *H01F 1/147* (2013.01); *C21D 9/46* (2013.01); *C21D 2201/05* (2013.01)

(58) Field of Classification Search
CPC ....................................... C21D 9/46
See application file for complete search history.

(56) References Cited

U.S. PATENT DOCUMENTS

| 5,393,355 A | 2/1995 | Nakano et al. |
| 2016/0177413 A1 | 6/2016 | Kwon et al. |

(Continued)

FOREIGN PATENT DOCUMENTS

| JP | 62-53579 B2 | 11/1987 |
| JP | 62-54873 B2 | 11/1987 |

(Continued)

OTHER PUBLICATIONS

English machine translation of WO 2012/068868 A1 of Zhu (Year: 2012).*

(Continued)

*Primary Examiner* — Jophy S. Koshy
(74) *Attorney, Agent, or Firm* — Birch, Stewart, Kolasch & Birch, LLP

(57) ABSTRACT

A grain-oriented electrical steel sheet according to the present invention includes a base steel sheet having plural grooves on a surface and a glass film formed on the surface of the base steel sheet. In case of viewing region including grooves in cross section orthogonal to groove longitudinal direction, a straight line passing through peak point present on profile line of glass film and parallel to groove width direction orthogonal to sheet thickness direction in cross section is defined as reference line, a point present on boundary line between glass film and base steel sheet and present at lowest location in sheet thickness direction is defined as deepest point, and a point present on boundary line and present at the highest location in the sheet thickness direction in region having the deepest point in a center and having length of 2 μm in groove width direction is defined as shallowest point, a relationship between shortest distance (Continued)

A between reference line and deepest point and shortest distance B between reference line and shallowest point satisfies Expression (1).

$$0.1 \ \mu m \leq A - B \leq 5.0 \ \mu m \quad (1)$$

2 Claims, 2 Drawing Sheets

(51) Int. Cl.
    *C22C 38/00*     (2006.01)
    *H01F 1/147*     (2006.01)

(56) References Cited

U.S. PATENT DOCUMENTS

| | | |
|---|---|---|
| 2018/0043474 A1 | 2/2018 | Hamamura et al. |
| 2018/0066334 A1 | 3/2018 | Mogi et al. |
| 2018/0071869 A1 | 3/2018 | Sakai et al. |
| 2019/0010566 A1 | 1/2019 | Hong et al. |

FOREIGN PATENT DOCUMENTS

| | | |
|---|---|---|
| JP | 5-121224 A | 5/1993 |
| JP | 7-138648 A | 5/1995 |
| JP | 7-220913 A | 8/1995 |
| JP | 2003-129135 A | 5/2003 |
| JP | 2013-510239 A | 3/2013 |
| JP | 2016-532776 A | 10/2016 |
| KR | 20160078119 A * | 7/2016 |
| KR | 10-1650400 B1 | 8/2016 |
| WO | WO 2011/068311 A2 | 6/2011 |
| WO | WO 2012/068868 A1 | 5/2012 |
| WO | WO 2016/171117 A1 | 10/2016 |
| WO | WO 2016/171124 A1 | 10/2016 |
| WO | WO 2016/171130 A1 | 10/2016 |
| WO | WO 2017/115888 A | 7/2017 |

OTHER PUBLICATIONS

English machine translation of KR 2016/0078119 A of Kwon (Year: 2016).*
International Search Report for PCT/JP2019/004282 dated Mar. 26, 2019.
Written Opinion of the International Searching Authority for PCT/JP2019/004282 (PCT/ISA/237) dated Mar. 26, 2019.

* cited by examiner

GRAIN-ORIENTED ELECTRICAL STEEL SHEET AND MANUFACTURING METHOD THEREOF

TECHNICAL FIELD OF THE INVENTION

The present invention relates to a grain-oriented electrical steel sheet and a manufacturing method thereof.

Priority is claimed on Japanese Patent Application No. 2018-022233, filed Feb. 9, 2018, the content of which is incorporated herein by reference.

RELATED ART

As a steel sheet for transformer cores, a grain-oriented electrical steel sheet exhibiting an excellent magnetic characteristic in a specific direction is known. The grain-oriented electrical steel sheet is a steel sheet in which crystal orientations are controlled by a combination of a cold rolling treatment and an annealing treatment such that a magnetization easy axis of crystal grains and a rolling direction coincide with each other.

As a technique for reducing an eddy-current loss, which is a kind of the iron loss of the grain-oriented electrical steel sheet, a grain-oriented electrical steel sheet having an insulating coating formed on a surface of a base steel sheet in which crystal orientations are controlled is known. The insulating coating plays a role of imparting not only an electric insulation property but also a tensile force, rust resistance, and the like to the base steel sheet.

In addition, as another method for reducing an abnormal eddy-current loss, a magnetic domain control method in which distorted (strained) regions or grooves formed in a direction intersecting with a rolling direction are formed along a rolling direction at predetermined intervals, thereby narrowing the widths of 180° magnetic domains (180° magnetic domains are refined) is known. Therefore, the magnetic domain control method is classified into a method for imparting local strain to a base steel sheet of a grain-oriented electrical steel sheet and a method for forming a groove on a surface of a base steel sheet on which a coating capable of applying a tensile force to the base steel sheet is present.

In the case of manufacturing a wound core using a grain-oriented electrical steel sheet in which magnetic domains are controlled using grooves, the grooves are not removed by carrying out a stress-relief annealing, and thus it is possible to maintain a magnetic domain refinement effect. Therefore, for wound cores, there is a case where the present magnetic domain control method is employed as a method for reducing the abnormal eddy-current loss.

FIG. 1 is a view showing a scheme of an electrical steel sheet in which grooves are formed. FIG. 1 shows a state in which plural grooves 11 is formed on a surface of a base steel sheet 10 such that the grooves are adjacent to each other in a rolling direction of the base steel sheet 10. In FIG. 1, a reference symbol θ indicates an angle formed by a direction (sheet width direction) orthogonal to the rolling direction of the base steel sheet 10 and a sheet thickness direction and a groove longitudinal direction of the groove 11. A reference symbol W indicates the width of the groove 11, a reference symbol D indicates the depth of the groove 11, and a reference symbol d indicates an interval between the grooves 11 adjacent to each other in the rolling direction. A variety of methods for forming a groove in an electrical steel sheet are proposed.

Patent Document 1 discloses an electrolytic etching method in which a groove is formed on a steel sheet surface of a grain-oriented electrical steel sheet by electrolytic etching.

Patent Document 2 discloses a gear press method in which a groove is formed on a steel sheet surface of a grain-oriented electrical steel sheet by mechanically pressing a gear to the steel sheet surface.

Patent Document 3 discloses a laser irradiation method in which a steel sheet (laser irradiation portion) was melted and evaporated by irradiation using a laser.

In addition, Patent Document 4 discloses a grain-oriented electrical steel sheet in which, as a configuration of grooves for obtaining a stable iron loss characteristic, scattered alloy layers of a layer in which a melt melted in an electrical steel sheet by laser irradiation is re-solidified in the steel sheet are uniformly distributed in groove parts.

PRIOR ART DOCUMENT

Patent Document

[Patent Document 1] Japanese Examined Patent Application, Second Publication No. S62-54873
[Patent Document 2] Japanese Examined Patent Application, Second Publication No. S62-53579
[Patent Document 3] Japanese Unexamined Patent Application, First Publication No. 2003-129135
[Patent Document 4] Published Japanese Translation No. 2016-532776 of the PCT International Publication for Patent Applications

DISCLOSURE OF THE INVENTION

Problems to be Solved by the Invention

The method in which a groove is formed in a cold-rolled steel sheet using a laser is excellent in terms of productivity. However, depending on electrical steel sheets, there are a case where magnetostriction is favorable and a case where magnetostriction is poor, and there is a problem in that a stable grain-oriented electrical steel sheet with a low magnetostriction cannot be obtained.

The present invention has been made in consideration of the above-described problem, and an object of the present invention is to provide a grain-oriented electrical steel sheet having a low iron loss and a low magnetostriction and a method for manufacturing a grain-oriented electrical steel sheet in which the grain-oriented electrical steel sheet is stably manufactured.

Means for Solving the Problem

The present inventors investigated a cause for a variation in the value of magnetostriction generated when a grain-oriented electrical steel sheet including a base steel sheet having plural grooves on a surface and a glass film formed on the surface of the base steel sheet is manufactured. As a result, it was clarified that the variation in the value of magnetostriction is attributed to a difference in the structures of the roots of the glass film in the inside of the grooves (hereinafter, referred to as the "groove parts"). As a result of carrying out additional research on the basis of this investigation result, the present inventors found that the value of magnetostriction can be stably controlled to a low-level value by controlling the structures of the roots of the glass film so as to satisfy a specific condition. The present invention has been made on the basis of the above-described finding, and the gist thereof is as described below.

(1) A grain-oriented electrical steel sheet according to an aspect of the present invention includes a base steel sheet having plural grooves on a surface and a glass film formed on the surface of the base steel sheet. An angle that a groove longitudinal direction makes with a direction orthogonal to a rolling direction and a sheet thickness direction of the base steel sheet is 0° to 40°, a width of the groove is 20 to 300 μm, a depth of the groove is 10 to 40 μm, and intervals of the grooves in the rolling direction are 2 to 30 mm. When, in the case of viewing a region including the grooves in a cross section orthogonal to the groove longitudinal direction, a point present on an profile line of the glass film and present at a highest location in the sheet thickness direction is defined as a peak point, a straight line passing through the peak point and parallel to a groove width direction orthogonal to the sheet thickness direction in the cross section is defined as a reference line, a point present on a boundary line between the glass film and the base steel sheet and present at a lowest location in the sheet thickness direction is defined as a deepest point, and a point present on the boundary line and present at the highest location in the sheet thickness direction in a region having the deepest point in a center and having a length of 2 μm in the groove width direction is defined as a shallowest point, a relationship between a shortest distance A between the reference line and the deepest point and a shortest distance B between the reference line and the shallowest point satisfies Expression (1).

$$0.1 \ \mu m \leq A - B \leq 5.0 \ \mu m \quad (1)$$

(2) A manufacturing method of a grain-oriented electrical steel sheet according to an aspect of the present invention is a method for manufacturing the grain-oriented electrical steel sheet described above (1) and includes a step of forming a groove on a surface of a cold-rolled steel sheet using a laser. In the above-described step, an atmosphere including a laser irradiation portion is an air or an inert gas, a dew point of the air is −30° C. to 0° C., and a dew point of the inert gas is −20° C. to 20° C.

Effects of the Invention

According to the above aspect of the present invention, a grain-oriented electrical steel sheet with low iron loss and low magnetostriction can be obtained.

EMBODIMENTS OF THE INVENTION

First, the contents of studies by the present inventors will be described in detail.

The present inventors investigated a cause for the value of magnetostriction varying when a grain-oriented electrical steel sheet including a base steel sheet having plural grooves on a surface and a glass film formed on the surface of the base steel sheet is manufactured. Regarding a low magnetostriction, the detail of an influential factor on the formation of grooves is not clear, and the investigation was carried out in consideration of the orientation integration degree after secondary recrystallization, the groove depth, and the coating tension; however, as a result of the investigation, no difference was observed in the orientation integration degree after secondary recrystallization, the groove depth, and the coating tension. Therefore, the present inventors considered that the variation in magnetostriction was attributed to a difference in the shape of the groove and investigated groove cross sections in detail. As a result, it was found that, in grain-oriented electrical steel sheets being different in magnetostriction, the statuses of the roots of a glass film in grooves portions were different from each other.

Figure 2:
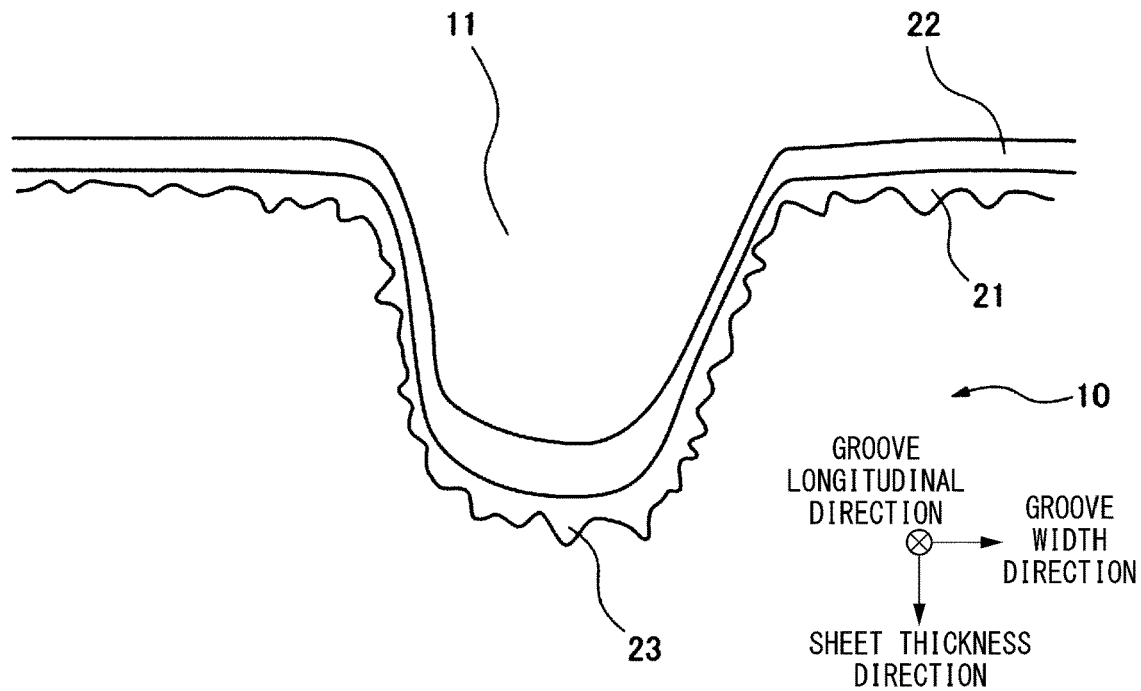
FIG. 2 is a schematic view of a groove periphery.

FIG. 2 shows a schematic illustration of the glass film in a groove periphery. FIG. 2 is a cross-sectional view of a grain-oriented electrical steel sheet including a base steel sheet and a glass film and, in more detail, a view showing a region including a groove in a cross section orthogonal to a groove longitudinal direction. A glass film 21 is generally, as described below, an oxide layer formed in the process of secondary recrystallization annealing and made of an oxide mainly including forsterite, the content rate of forsterite is generally 70% by volume or more, and the remainder is an oxide including aluminum, calcium, or the like. Grooves 11 are formed in a base steel sheet 10, and the glass film 21 made of the above-described oxide is formed on a surface of the base steel sheet 10 including the surfaces of the grooves 11. On a surface of the glass film 21, furthermore, a tension coating 22 may be provided. Roots 23 of the glass film 21 are portions in which the glass film 21 is elongated toward the inside of the base steel sheet 10 and are generally present at intervals of approximately 0.1 to 2 μm.

The results of the investigation showed that, in a case where magnetostriction was large, the roots 23 of the glass film 21 in the groove parts excessively developed, and, in a case where magnetostriction was favorable, the degree of development of the roots 23 of the glass film 21 was almost the same as those in portions other than the groove parts. The reason for magnetostriction increasing when the roots 23 of the glass film 21 excessively develop is not clear, but is assumed that it becomes easy for 90° magnetic domains to be generated from the roots 23 of the glass film 21 as points of origin.

In a case where the root 23 of the glass film 21 is too short, it is considered that there is no adverse influence on magnetostriction, but the adhesion between the glass film 21 and base metal (base steel sheet 10) degrades, and thus a crack is likely to be generated in the coating in the groove part. When moisture enters through this crack, rust is generated, and the insulation property, the space factor, and the external appearance are impaired.

The present inventors studied a method for preventing the excessive development of the root 23 of the glass film 21 in the groove part and consequently found that a depth at which the root 23 of the glass film 21 is generated can be controlled by controlling the dew point of an assist gas used during the formation of the groove to an appropriate range.

Hereinafter, the configuration of a grain-oriented electrical steel sheet according to the present embodiment (hereinafter, abbreviated as the present electrical steel sheet) will be described.

Figure 1:
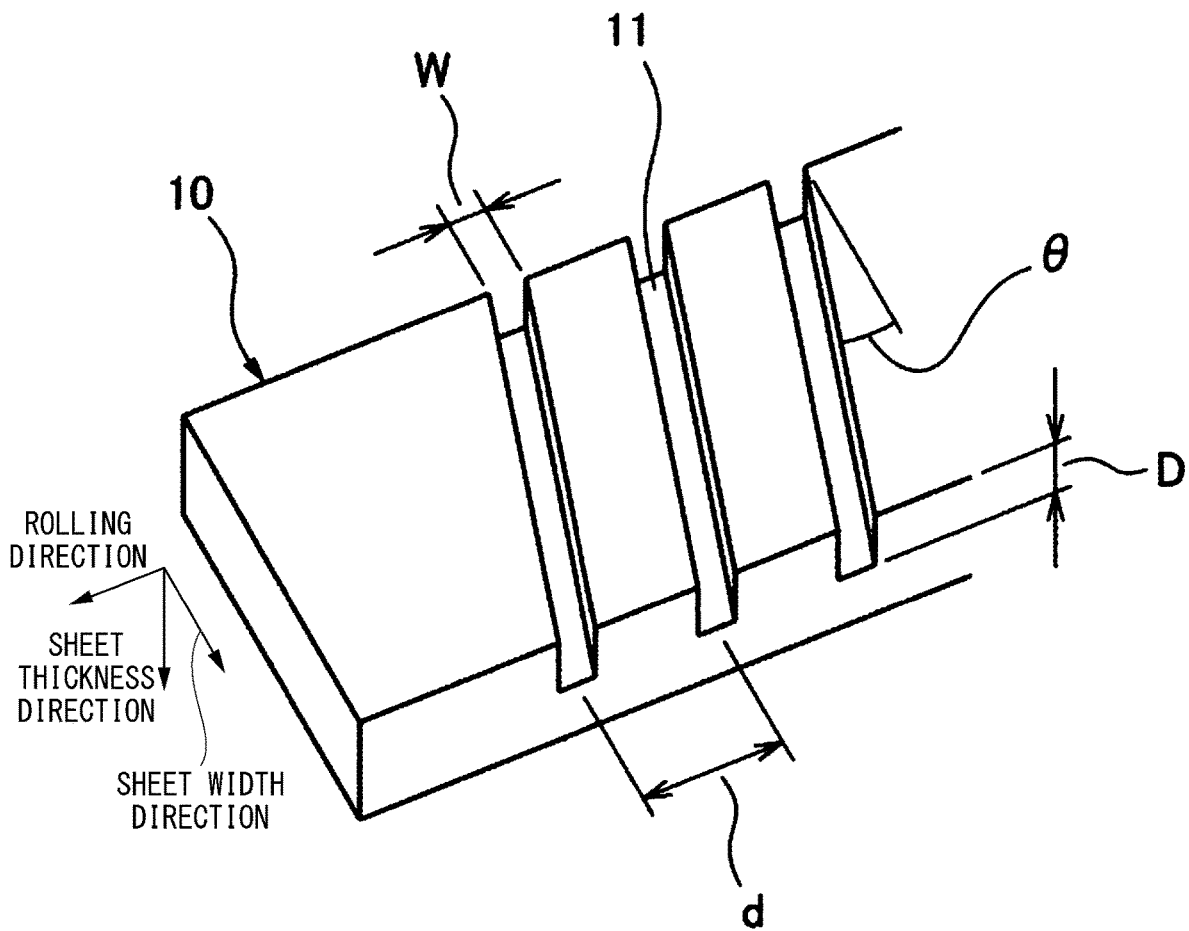
FIG. 1 is a schematic view showing an electrical steel sheet in which grooves are formed.
Figure 3:
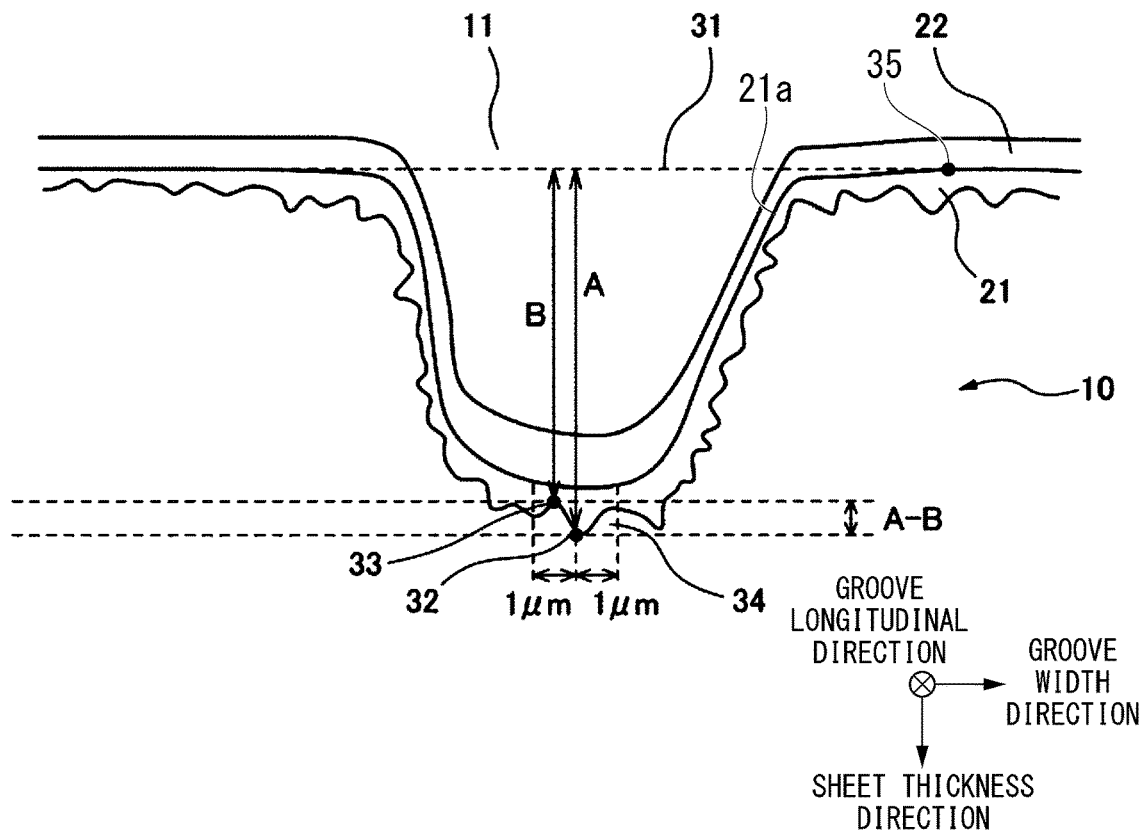
FIG. 3 is a schematic view for describing an interface mixed region.

The present electrical steel sheet includes the base steel sheet 10 having the plural grooves 11 on a surface and the glass film 21 formed on the surface of the base steel sheet 10 (refer to FIG. 1 and FIG. 3). In the present electrical steel sheet, the tension coating (insulating coating) 22 may be formed on a surface of the glass film 21. As shown in FIG. 1, on the surface of the base steel sheet 10, the plural grooves 11 is formed so as to be adjacent to each other in a rolling direction of the base steel sheet 10. A direction (angle θ) of the groove 11, a width W and a depth D of the groove 11, and an interval d between the grooves do not affect magnetostriction or a crack in the groove part, which is the object of the present invention, and are determined, similar to an ordinary grain-oriented electrical steel sheet, in consideration of an iron loss.

The angle θ that a groove longitudinal direction of the groove 11 makes with a direction (sheet width direction) orthogonal to the rolling direction and the sheet thickness direction of the base steel sheet 10 is set to 0° to 40° because it becomes impossible to obtain an iron loss improvement effect when the angle is too large. The width W of the groove 11 is set to 20 to 300 μm because a favorable iron loss cannot be obtained when the width is too wide or too narrow. The depth D of the groove 11 is set to 10 to 40 μm because a favorable iron loss cannot be obtained when the depth is too shallow or too deep. The grooves 11 are formed in the rolling direction at the intervals d of 2 to 30 mm. The intervals d between the grooves 11 may not be equal intervals.

An interface mixed region and the configuration of the root of the glass film 21 in the groove part in the present electrical steel sheet will be described using FIG. 3. FIG. 3 is a cross-sectional view of the present electrical steel sheet and a view showing a region including the groove 11 in a cross section orthogonal to the groove longitudinal direction of the groove 11.

In the present electrical steel sheet, the root of the glass film 21 in the inside of the groove 11 formed on the base material steel sheet 10 is not allowed to excessively develop and is controlled to an appropriate range. Specifically, as shown in FIG. 3, in the case of viewing the region including the groove 11 in the cross section orthogonal to the groove longitudinal direction of the groove 11, a point present on an profile line 21a of the glass film 21 and present at the highest location in the sheet thickness direction is defined as a peak point 35. A straight line passing through the peak point 35 and parallel to a groove width direction orthogonal to the sheet thickness direction in the cross section shown in FIG. 3 is defined as a reference line 31. In the cross section shown in FIG. 3, a point present on a boundary line 12 between the glass film 21 and the base steel sheet 10 and present at the lowest (shallowest) location in the sheet thickness direction is defined as a deepest point 32. In addition, in the cross section shown in FIG. 3, a point present on the boundary line 12 and present at the highest (shallowest) location in the sheet thickness direction in a region having the deepest point 32 in the center and having a length of 2 μm (that is, ±1 μm) in the groove width direction is defined as a shallowest point 33.

When the reference line 31, the deepest point 32, and the shallowest point 33 are defined in the cross section shown in FIG. 3 as described above, in the present electrical steel sheet, the structure of the root of the glass film 21 is controlled such that a relationship between a shortest distance A between the reference line 31 and the deepest point 32 and a shortest distance B between the reference line 31 and the shallowest point 33 satisfies Expression (1).

Here, the shortest distance A between the reference line 31 and the deepest point 32 refers to the length of a straight line that is perpendicular to the reference line 31 and connects the deepest point 32 and the reference line 31. In addition, the shortest distance B between the reference line 31 and the shallowest point 33 refers to the length of a straight line that is perpendicular to the reference line 31 and connects the shallowest point 33 and the reference line 31.

Hereinafter, a region between the deepest point 32 and the shallowest point 33 in the sheet thickness direction is defined as an interface mixed region 34, and a value (=A−B) obtained by subtracting the shortest distance B from the shortest distance A is defined as the thickness of the interface mixed region 34. In the interface mixed region 34, steel and the glass film are present in a mixed form.

$$0.1 \ \mu m \leq A - B \leq 5.0 \ \mu m \tag{1}$$

The cross sections of the groove parts at five arbitrary places (here, respectively different grooves 11) in the base steel sheet 10 in which the grooves 11 are present are observed using a scanning electron microscope, the thicknesses of the interface mixed regions 34 are obtained from photos of the cross sections, and the average value of the thicknesses at the five places is regarded as the thickness of the interface mixed region 34.

In a case where the thickness (=A−B) of the interface mixed region 34 is less than 0.1 μm, the adhesion between the glass film 21 and the base metal (base steel sheet 10) degrades, and thus a crack is likely to be generated in the coating in the groove part. Therefore, the lower limit of the thickness of the interface mixed region 34 is 0.1 μm. On the other hand, in a case where the thickness of the interface mixed region 34 exceeds 5.0 μm, the value of magnetostriction increases due to the excessive development of the root of the glass film 21. Therefore, the upper limit of the thickness of the interface mixed region 34 is 5.0 μm. In order to obtain an effect for improving the adhesion of the coating and an effect for reducing magnetostriction in a well-balanced manner, the thickness of the interface mixed region 34 is 1 μm or more and 3 μm or less.

Next, a method for manufacturing the present electrical steel sheet, which aims for the above-described configuration, will be described.

First, a cold-rolled steel sheet for the present electrical steel sheet is manufactured by an ordinary method. The method for manufacturing the cold-rolled steel sheet is not particularly limited, and an ordinarily-known method may be used.

Next, the cold-rolled steel sheet is irradiated using a laser, thereby forming plural grooves in a direction intersecting with a rolling direction at predetermined intervals.

As a laser light source, it is possible to use, for example, a high-power laser generally used for industrial uses such as a fiber laser, a YAG laser, a semiconductor laser, or a $CO_2$ laser. A pulse laser or a continuous-wave laser may also be used as long as it is possible to stably form a groove. As conditions for irradiation with laser light, it is possible to set, for example, a laser output to 200 to 3,000 W, a light focus spot diameter (a diameter including 86% of the laser output; hereinafter, referred to as "86% diameter") in the rolling direction of the laser light to 10 to 1,000 μm, a light focus spot diameter (86% diameter) in the sheet width direction of the laser light to 10 to 1,000 μm, and a laser scanning rate to 5 m/s to 100 m/s.

At the same time as the irradiation with laser light, an assist gas is blown to a portion of the steel sheet to which the laser light is radiated. The assist gas plays a role of removing a component melted or evaporated from the steel sheet due to the laser irradiation. Due to the assist gas blown, the laser light stably arrives at the steel sheet, and thus the grooves are stably formed. The flow rate of the assist gas can be set to, for example, 10 to 1,000 liters per minute.

In the present invention, an air or an inert gas is used as the assist gas, and the dew point thereof is set to −30° C. to 0° C. in the case of the air and to −20° C. to 20° C. in the case of the inert gas. In such a case, it is possible to form the root of the glass film satisfying the above-described Expression (1).

After the grooves are formed in the steel sheet, the cold-rolled steel sheet is decarburized and nitrided using well-known methods, and then an annealing separating agent mainly including MgO is applied thereto, heated, retained, and then cooled, thereby forming the glass film. The glass film alone is capable of imparting a tensile force to the steel sheet; however, in order to enhance a magnetic domain control effect, generally, a tension coating (insulating coating) is formed on the glass film.

As decarburization conditions, well-known ordinary conditions can be set; for example, the cold-rolled steel sheet is heated up to 850° C., then, retained for 60 seconds, and then cooled, a decarburization atmosphere is a hydrogen-inert gas atmosphere in which $PH_2O/PH_2$ is preferably set in a range of 0.15 to 0.65, and, particularly, favorable characteristics can be obtained at $PH_2O/PH_2$ of approximately 0.33. The nitriding can also be carried out by a well-known ordinary method, and the nitriding amount can be set to, for example, a range of 50 to 400 ppm; however, particularly, favorable characteristics can be obtained at a nitriding amount of approximately 200 ppm. Regarding the composition of the annealing separating agent, a well-known ordinary annealing separating agent can be used, and, for example, an annealing separating agent including 100 parts by mass of MgO and 5 parts by mass of $TiO_2$ with an additive of, for example, $FeCl_2$ added as much as 200 ppm in terms of chlorine can be used. The formation of the glass film is formed by a step of, as described below, winding the steel sheet in a coil shape, retaining the steel sheet at a peak temperature of 1,200° C. for approximately 20 hours, and then cooling the steel sheet. As the tension coating, for example, a tension coating including aluminum phosphate as a main component can be used, and the thickness can be set to 1 μm.

A mechanism of the composition and dew point of the assist gas affecting the development of the root of the glass film in the groove part is considered as described below.

The root of the glass film is mainly made of forsterite and is formed in the process of secondary recrystallization annealing after the formation of the grooves. A raw material forming the forsterite is made up of $SiO_2$ present on the steel sheet surface before secondary recrystallization and MgO in the annealing separating agent. $SiO_2$ present on the steel sheet surface is generally derived from a decarboxylated layer. Additionally, there is also a case where moisture in the annealing separating agent is emitted in the process of secondary recrystallization annealing heating, oxidizes the steel sheet, and further increases $SiO_2$. The oxidation of the steel sheet by moisture in the annealing separating agent is referred to as additive oxidation, and it is considered that, when additive oxidation occurs, the glass film is excessively formed, and the root of the glass film develops.

A measure for preventing the occurrence of additive oxidation is the optimization of the amount of the annealing separating agent applied and the control of the amount of moisture in the annealing separating agent. When the amount of the annealing separating agent applied is too small, the amount of Mg, which is the raw material of the forsterite, becomes small, and it becomes impossible to obtain a favorable glass film. In addition, when the amount of moisture is too small, $SiO_2$ decomposes in the process of heating for secondary recrystallization annealing, the raw material of forsterite becomes small, and it becomes impossible to obtain a favorable glass film. When the amount of the annealing separating agent is too large, there is no particular harm, but the unreacted annealing separating agent increases, and such an annealing separating agent is applied in vain, which is not economical. When the amount of moisture is too large, excessive internal oxidation occurs as described above, and a problem of the root of the glass film being excessively formed is caused.

When there is no groove, the application amount and the amount of moisture are only things to be controlled at the time of applying the annealing separating agent; however, in the groove part, the annealing separating agent fills, and thus additive oxidation is more likely to occur than in other portions of the steel sheet.

When the amount of the annealing separating agent applied or the amount of moisture is decreased in order to form the glass film in the portion of the groove in an appropriate amount, a robust glass film is not formed in a portion other than the groove, and thus it is not possible to solve the problem using the amount of the annealing separating agent applied or the amount of moisture.

Therefore, the additive oxidation of the portion of the groove is suppressed by controlling the dew point of the assist gas at the time of forming the groove, whereby the excessive development of the root of the glass film in the portion of the groove is suppressed. A mechanism thereof is considered as described below.

When an atmosphere with an appropriate oxygen potential is provided at the time of forming the groove by heating with a laser, an oxide film having a favorable atmosphere-sealing property is formed. In order to control the oxygen potential, the dew point of the assist gas is set to −30° C. to 0° C. in an air composition. In a case where the oxide film is formed under the above-described conditions, the oxide film is considered to function as a barrier layer into which oxygen in steel does not intrude even when a large amount of moisture is emitted from the annealing separating agent in the portion of the groove at the time of heating for secondary recrystallization.

When the dew point is too high, a large amount of $SiO_2$ is generated, and the same phenomenon as excessive additive oxidation occurs. On the other hand, when the dew point is too low, the sealing property of an oxide film to be generated becomes excessively effective, a $SiO_2$ oxide layer does not sufficiently develop, and a root of the robust glass film is not formed.

For the above-described reasons, in the method for manufacturing the present electrical steel sheet, in the step of forming the grooves using a laser on the surface of the cold-rolled steel sheet, the dew point of the air is controlled to −30° C. to 0° C. in a case where the atmosphere including the laser irradiation portion is an air, that is, a case where an air is used as the assist gas.

In the case of using an inert gas as the assist gas, the dew point of the inert gas is controlled to −20° C. to 20° C. As the inert gas, nitrogen, helium, argon, or the like is exemplified.

With the above-described manufacturing method, it is possible to obtain a grain-oriented electrical steel sheet in which the root of a glass film appropriately develops and magnetostriction is favorable.

In the related art, a dehumidified assist gas is used in order to prevent the generation of moisture at the time of laser irradiation; however, as such an assist gas, no gas having a specially-controlled dew point is in use. It is a technical common sense that the dew point of a so-called dry gas, which is, generally, industrially used, is approximately −35° C. In the method for manufacturing the present electrical steel sheet, the root of the glass film in the groove part was controlled to a specific state (state satisfying Expression (1)) by positively controlling the dew point of the assist gas to a specific range, and, as a result, it was possible to satisfy both the improvement of a magnetic characteristic (magnetostriction) and the adhesion of the glass film. The problem of moisture generated during laser irradiation due to the control of the dew point of the assist gas to the above-described specific range can be solved by holding the atmosphere temperature during the laser irradiation to approximately 90° C.

EXAMPLES

Hereinafter, the present invention will be specifically described using examples. The present invention is not limited to the aspects of the examples described below.

Example 1

A slab including Si: 3.4% by mass, Mn: 0.15% by mass, S: 0.006% by mass, C: 0.045% by mass, acid-soluble Al: 0.022% by mass, and N: 0.007% by mass was used as a material and hot-rolled by a well-known method, then hot-band annealing was carried out, and a steel sheet having a final sheet thickness of 0.22 mm was obtained by cold rolling.

Subsequently, a surface of the steel sheet was irradiated using a laser, and plural grooves extending in a direction intersecting with a rolling direction was formed along the rolling direction at intervals of 5 mm. A groove-forming direction was set to a direction 20° inclined toward an L direction with respect to a C (width) direction of the steel sheet, a groove width was set to 50 μm, and a groove depth was set to 25 μm.

As conditions for irradiation with laser light, the laser output was adjusted to 200 to 3,000 W, a light focus spot diameter (86% diameter) in the rolling direction of the laser light was adjusted to 10 to 1,000 μm, a light focus spot diameter (86% diameter) in a sheet width direction of the laser light was adjusted to 10 to 1,000 μm, and a laser scanning rate was adjusted to a range of 5 to 100 m/s.

An assist gas for efficiently removing a metal of the steel sheet melted or evaporated by the laser at the time of the laser irradiation was blown at 100 liters/minute. A composition and a dew point of the assist gas were set as shown in Table 1.

The cold-rolled steel sheet in which the grooves were formed was decarburized, and, furthermore, a nitriding treatment was carried out thereon. As decarburization conditions, the cold-rolled steel sheet was heated up to 850° C., then, retained for 60 seconds, and cooled. A decarburization atmosphere was a hydrogen-inert gas atmosphere, and $PH_2O/PH_2$ was set to 0.33. In addition, a nitriding amount was set to 200 ppm.

After that, an annealing separating agent including MgO as a main component was applied such that an application amount reached 4 g/m$^2$ on a single surface. As a composition of the annealing separating agent, $FeCl_2$ was added to MgO: 100 parts by mass and $TiO_2$: 5 parts by mass such that an amount added reached 200 ppm in terms of chlorine.

Subsequently, the steel sheet was wound in a coil shape, retained at a peak temperature of 1,200° C. for 20 hours, and then cooled, thereby forming a glass film on the surface. Furthermore, a tension coating including aluminum phosphate as a main component was formed such that a thickness reached 1 μm, thereby obtaining a grain-oriented electrical steel sheet. A tensile force at this time was 12 MPa in the rolling direction, including the glass film.

A thickness (=A−B) of a region in which a base metal and the glass film were present in a mixed form (interface mixed region) in a groove part of the obtained grain-oriented electrical steel sheet, magnetic characteristics (magnetostriction, magnetic flux density, and iron loss), and presence or absence of a crack in the groove part are shown below.

TABLE 1

| No | Type | Assist gas Composition | Dew point (° C.) | Interface mixed region (μm) | Magnetostriction $(\lambda p - p) \times 10^{-6}$ | Magnetic flux density (T) | Iron loss W17/50 (W/kg) | Crack in groove part |
|---|---|---|---|---|---|---|---|---|
| 1 | Example | Air | −30 | 0.8 | 0.43 | 1.90 | 0.78 | Absent |
| 2 | Example | Air | −23 | 2 | 0.41 | 1.89 | 0.78 | Absent |
| 3 | Example | Air | −15 | 1 | 0.21 | 1.90 | 0.78 | Absent |
| 4 | Example | Air | −8 | 3 | 0.38 | 1.90 | 0.79 | Absent |
| 5 | Example | Air | 0 | 5 | 0.58 | 1.89 | 0.78 | Absent |
| 6 | Example | Nitrogen | −20 | 2 | 0.48 | 1.90 | 0.78 | Absent |
| 7 | Example | Nitrogen | 0 | 1 | 0.32 | 1.89 | 0.79 | Absent |
| 8 | Example | Nitrogen | 20 | 3 | 0.46 | 1.89 | 0.78 | Absent |
| 9 | Comparative Example | Air | −35 | 0.05 | 0.44 | 1.91 | 0.76 | Present |
| 10 | Comparative Example | Air | 10 | 7 | 0.76 | 1.89 | 0.81 | Absent |
| 11 | Comparative Example | Nitrogen | −25 | 0.08 | 0.55 | 1.90 | 0.78 | Present |
| 12 | Comparative Example | Nitrogen | 30 | 6 | 0.78 | 1.88 | 0.84 | Absent |

Magnetostriction was indicated by an absolute value of a difference between a length of a most-elongated steel sheet and a length of a most-contracted steel sheet at the time of exciting the steel sheet with a sinusoidal wave of 50 Hz such that a maximum magnetic flux density of the steel sheet reached 1.7 T and evaluated as favorable when the value was $0.6 \times 10^{-6}$ or less.

An iron loss was an iron loss (W17/50) in the case of exciting the steel sheet with a sinusoidal wave of 50 Hz such that the maximum magnetic flux density of the steel sheet reached 1.7 T and evaluated as favorable when the iron loss was 0.8 W/kg or less.

Regarding the crack in the groove part, the coating in the groove part in the obtained sample in a range of 10 mm in a groove longitudinal direction was observed using a scanning electron microscope, and, in a case where a crack having a length of longer than 0.5 μm was not present, the crack was determined to be absent.

From the results of the present example, it was found that, when the composition and dew point of the assist gas are in the scope of the present invention, the thickness of the interface mixed region is controlled to a range of 0.1 μm or more and 5.0 μm or less, there is no crack in the groove part, and the magnetostriction and the iron loss are favorable.

Example 2

A slab including Si: 3.4% by mass, Mn: 0.15% by mass, S: 0.006% by mass, C: 0.045% by mass, acid-soluble Al: 0.022% by mass, and N: 0.007% by mass was used as a material and hot-rolled by a well-known method, then hot-band annealing was carried out, and a steel sheet having a final sheet thickness of 0.22 mm was obtained by cold rolling.

Subsequently, a surface of the steel sheet was irradiated using a laser, and plural grooves extending in a direction intersecting with a rolling direction was formed along the rolling direction at intervals of 5 mm. A groove-forming direction was set to a direction 20° inclined toward the L direction with respect to the C direction of the steel sheet, and a groove width and a groove depth were set to dimensions shown in Table 2.

Conditions for irradiation with laser light were set to be the same as those in Example 1, and, as an assist gas, an air having a dew point of −15° C. was blown at 100 liters/minute.

The cold-rolled steel sheet in which the grooves were formed was decarburized, and, furthermore, a nitriding treatment was carried out thereon. As decarburization conditions, the cold-rolled steel sheet was heated up to 850° C., then, retained for 60 seconds, and cooled. A decarburization atmosphere was a hydrogen-inert gas atmosphere, and $PH_2O/PH_2$ was set to 0.33. In addition, a nitriding amount was set to 200 ppm.

After that, an annealing separating agent including MgO as a main component was applied such that an application amount reached 4 g/m² on a single surface. As a composition of the annealing separating agent, $FeCl_2$ was added to MgO: 100 parts by mass and $TiO_2$: 5 parts by mass such that an amount added reached 200 ppm in terms of chlorine.

Subsequently, the steel sheet was wound in a coil shape, retained at a peak temperature of 1,200° C. for 20 hours, and then cooled, thereby forming a glass film on the surface. Furthermore, a tension coating including aluminum phosphate as a main component was formed such that a thickness reached 1 μm, thereby obtaining a grain-oriented electrical steel sheet. A tensile force at this time was 12 MPa in the rolling direction, including the glass film.

A thickness of the interface mixed region in the obtained grain-oriented electrical steel sheet, magnetic characteristics (magnetostriction, magnetic flux density, and iron loss), and presence or absence of a crack in the groove part are shown below.

Methods for evaluating the magnetostriction, the iron loss, and the crack in the groove part were the same as those in Example 1. From the results of the present example, it was found that, when the groove depth and the groove width are in the scope of the present invention, there is no crack in the groove part, and the magnetostriction and the iron loss are favorable.

Example 3

A slab including Si: 3.4% by mass, Mn: 0.15% by mass, S: 0.006% by mass, C: 0.045% by mass, acid-soluble Al: 0.022% by mass, and N: 0.007% by mass was used as a material and hot-rolled by a well-known method, then hot-band annealing was carried out, and a steel sheet having a final sheet thickness of 0.22 mm was obtained by cold rolling.

Subsequently, a surface of the steel sheet was irradiated using a laser, and plural grooves extending in a direction intersecting with a rolling direction was formed in a direction inclined at an angle shown in Table 3 toward the L direction with respect to the C direction of the steel sheet at intervals shown in Table 3 along the rolling direction. A groove width was set to 50 μm, and a groove depth was set to 25 mm.

Conditions for irradiation with laser light were set to be the same as those in Example 1, and, as an assist gas, an air having a dew point of −15° C. was blown at 100 liters/minute.

The cold-rolled steel sheet in which the grooves were formed was decarburized, and, furthermore, a nitriding treatment was carried out thereon. As decarburization conditions, the cold-rolled steel sheet was heated up to 850° C., then, retained for 60 seconds, and cooled. A decarburization atmosphere was a hydrogen-inert gas atmosphere, and $PH_2O/PH_2$ was set to 0.33. In addition, a nitriding amount was set to 200 ppm.

After that, an annealing separating agent including MgO as a main component was applied such that an application amount reached 4 g/m² on a single surface. As a composition of the annealing separating agent, $FeCl_2$ was added to MgO: 100 parts by mass and $TiO_2$: 5 parts by mass such that an amount added reached 200 ppm in terms of chlorine.

Subsequently, the steel sheet was wound in a coil shape, retained at a peak temperature of 1,200° C. for 20 hours, and then cooled, thereby forming a glass film on the surface. Furthermore, a tension coating including aluminum phosphate as a main component was formed such that a thickness reached 1 μm, thereby obtaining a grain-oriented electrical steel sheet. A tensile force at this time was 12 MPa in the rolling direction, including the glass film.

TABLE 2

| No | Type | Groove depth (μm) | Groove width (μm) | Interface mixed region (μm) | Magnetostriction $(\lambda p - p) \times 10^{-6}$ | Magnetic flux density (T) | Iron loss W17/50 (W/kg) | Crack in groove part |
|---|---|---|---|---|---|---|---|---|
| 13 | Example | 23 | 20 | 2 | 0.25 | 1.90 | 0.77 | Absent |
| 14 | Example | 25 | 50 | 1 | 0.21 | 1.90 | 0.76 | Absent |
| 15 | Example | 23 | 100 | 2 | 0.32 | 1.89 | 0.78 | Absent |
| 16 | Example | 26 | 300 | 2 | 0.29 | 1.90 | 0.79 | Absent |
| 17 | Comparative Example | 23 | 400 | 4 | 0.30 | 1.87 | 0.85 | Absent |
| 18 | Example | 10 | 48 | 2 | 0.27 | 1.91 | 0.79 | Absent |
| 19 | Example | 25 | 50 | 1 | 0.21 | 1.90 | 0.76 | Absent |
| 20 | Example | 40 | 55 | 3 | 0.35 | 1.88 | 0.79 | Absent |
| 21 | Comparative Example | 8 | 40 | 2 | 0.36 | 1.92 | 0.82 | Absent |
| 22 | Comparative Example | 50 | 58 | 3 | 0.54 | 1.96 | 0.83 | Absent |

A thickness of the interface mixed region in the obtained grain-oriented electrical steel sheet, magnetic characteristics (magnetostriction, magnetic flux density, and iron loss), and presence or absence of a crack in the groove part are shown below.

TABLE 3

| No | Type | Groove pitch (mm) | Angle (°) | Interface mixed region (μm) | Magnetostriction (λp − p) × $10^{-6}$ | Magnetic flux density (T) | Iron loss W17/50 (W/kg) | Crack in groove part |
|---|---|---|---|---|---|---|---|---|
| 23 | Example | 2 | 20 | 2 | 0.37 | 1.88 | 0.78 | Absent |
| 24 | Example | 5 | 20 | 1 | 0.21 | 1.90 | 0.76 | Absent |
| 25 | Example | 10 | 20 | 2 | 0.42 | 1.91 | 0.77 | Absent |
| 26 | Example | 30 | 20 | 5 | 0.46 | 1.91 | 0.8 | Absent |
| 27 | Comparative Example | 1.5 | 20 | 1 | 0.20 | 1.87 | 0.90 | Absent |
| 28 | Comparative Example | 35 | 20 | 5 | 0.46 | 1.91 | 0.84 | Absent |
| 29 | Example | 5 | 0 | 2 | 0.26 | 1.88 | 0.75 | Absent |
| 30 | Example | 5 | 20 | 1 | 0.21 | 1.90 | 0.76 | Absent |
| 31 | Example | 5 | 40 | 2 | 0.30 | 1.91 | 0.80 | Absent |
| 32 | Comparative Example | 5 | 50 | 2 | 0.42 | 1.91 | 0.85 | Absent |

Methods for evaluating the magnetostriction, the iron loss, and the crack in the groove part were the same as those in Example 1. From the results of the present example, it was found that, when groove pitches and, regarding a groove-forming direction, the angle inclined toward the L direction with respect to the C direction of the steel sheet are in the scope of the present invention, there is no crack in the groove part, and the magnetostriction and the iron loss are favorable.

BRIEF DESCRIPTION OF THE REFERENCE SYMBOLS 10 steel sheet
11 groove
21 glass film
22 tension coating
23 root of glass film
31 reference line
32 deepest point
33 shallowest point
34 interface mixed region
35 peak point
θ angle formed by groove with respect to direction perpendicular to rolling direction
W width of groove
D depth of groove
d: interval between grooves

The invention claimed is:

1. A grain-oriented electrical steel sheet comprising:
a base steel sheet having plural grooves on a surface; and
a glass film formed on the surface of the base steel sheet and on the plural grooves, the content rate of forsterite in the glass film being 70% by volume or more,
wherein:
the grain-oriented electrical steel sheet has an iron loss, $W_{17/50}$, of 0.8 W/kg or less,
an angle that a groove longitudinal direction makes with a direction orthogonal to a rolling direction and a sheet thickness direction of the base steel sheet is 0° to 40°,
a width of a groove of the plural grooves forming the angle is 20 to 300 μm, at an outermost surface level of the base steel sheet,
a depth of the groove forming the angle is 10 to 40 μm,
intervals of the grooves forming the angle in the rolling direction are 2 to 30 mm, and
in viewing a region including the grooves in a cross section orthogonal to the groove longitudinal direction,
a point present on a profile line of the glass film and present at a highest location in the sheet thickness direction is defined as a peak point,
a straight line passing through the peak point and parallel to a groove width direction orthogonal to the sheet thickness direction in the cross section is defined as a reference line,
a point present on a boundary line between the glass film and the base steel sheet and present at a lowest location in the sheet thickness direction is defined as a deepest point,
a point present on the boundary line and present at the highest location in the sheet thickness direction in a region having the deepest point in a center and having a length of 2 m in the groove width direction is defined as a shallowest point, and
a relationship between a shortest distance A between the reference line and the deepest point and a shortest distance B between the reference line and the shallowest point satisfies Expression (1), $$0.1 \text{ μm} \leq A - B \leq 5.0 \text{ μm} \quad (1).$$

2. A manufacturing method of the grain-oriented electrical steel sheet of claim 1, the method comprising:
a step of forming a groove on a surface of a cold-rolled steel sheet using a laser; and
a step of forming a glass film after the step of forming a groove, by performing a decarburizing, nitriding, applying an annealing separating agent including MgO, heating, retaining, and cooling,
wherein, in the step of forming a groove, an atmosphere including a laser irradiation portion is an air or an inert gas, a dew point of the air is −30° C. to 0° C., and a dew point of the inert gas is −20° C. to 20° C.

* * * * *